United States Patent [19]
Rose et al.

[11] Patent Number: 5,779,265
[45] Date of Patent: Jul. 14, 1998

[54] REACTION CANISTER WITH INFLATOR OUTPUT TREATMENT FINS

[76] Inventors: Larry D. Rose, 1433 E. 2500 North, Layton, Utah 84040; Donald R. Lauritzen, 948 W. 3rd North, Hyrum, Utah 84319; Bradley D. Harris, 761 Southampton, Farmington, Utah 84025

[21] Appl. No.: 732,010

[22] Filed: Oct. 16, 1996

[51] Int. Cl.$^6$ ............................................. B60R 21/26
[52] U.S. Cl. .................. 280/736; 280/728.2; 280/710; 280/741; 280/742
[58] Field of Search .................. 280/720.2, 736, 280/740, 741, 742

[56] References Cited

U.S. PATENT DOCUMENTS

| | | | |
|---|---|---|---|
| 5,172,933 | 12/1992 | Strasser | 280/740 |
| 5,332,256 | 7/1994 | Lauritzen et al. | 280/728.2 |
| 5,378,015 | 1/1995 | Rink et al. | 280/736 |
| 5,407,226 | 4/1995 | Lauritzen et al. | 280/728.1 |
| 5,480,185 | 1/1996 | Lowe et al. | 280/740 |
| 5,482,316 | 1/1996 | Lang et al. | 280/741 |
| 5,490,690 | 2/1996 | Mihm | 280/728.2 |
| 5,503,806 | 4/1996 | Fulmer et al. | 422/164 |
| 5,518,268 | 5/1996 | Moore et al. | 280/737 |
| 5,536,041 | 7/1996 | Acker et al. | 280/740 |
| 5,544,911 | 8/1996 | Vine | 280/728.2 |
| 5,551,724 | 9/1996 | Armstrong, III et al. | 280/737 |
| 5,564,738 | 10/1996 | Johnson | 280/736 |
| 5,582,423 | 12/1996 | Rion et al. | 280/728.2 |

*Primary Examiner*—Kenneth R. Rice

[57] ABSTRACT

Featured for use as a part of an inflator-containing inflatable restraint system is a reaction canister in which the reaction canister body includes a plurality of inflator output treatment fins extending towards, without contacting, the associated inflator. Also, provided are corresponding processes for treating the gas output of a vehicular safety restraint inflator. In practice, such treatment of a contacting stream typically involves one or more of: cooling, redirection of flow, and removal or filtering of particulate therefrom.

19 Claims, 4 Drawing Sheets

REACTION CANISTER WITH INFLATOR OUTPUT TREATMENT FINS

CROSS REFERENCE TO RELATED APPLICATION

The subject matter of this application is related to prior application U.S. Ser. No. 08/326,996, filed on Oct. 21, 1994, now U.S. Pat. No. 5,551,724, issued on Sep. 3, 1996.

BACKGROUND OF THE INVENTION

This invention relates generally to inflatable restraint systems and, more particularly, to the treatment of gas generated or emitted by inflatable restraint system inflators.

Airbag module assemblies generally include three basic components: 1) a cushion or airbag that is inflated with gas such as when the vehicle encounters a sudden deceleration, 2) an inflator which upon actuation serves to provide the gas used to inflate the airbag, and 3) a reaction canister which typically functions as a structural housing supporting assembly components such as the inflator and the airbag, for example, while providing a mounting base for installation of the assembly in a vehicle and direction to the inflation gases resulting from the inflator.

Many types of inflators have been disclosed in the art for use in inflatable restraint systems. One type involves the utilization of a quantity of stored compressed gas which is selectively released to inflate the associated airbag. Another type derives a gas source from a combustible gas generating material, such as a pyrotechnic, which, upon ignition, generates a quantity of gas sufficient to inflate the associated airbag. In a third type, the airbag inflating gas results from the combination of a stored compressed gas and the combustion products of a pyrotechnic gas generating material. The last mentioned type is commonly referred to as an augmented gas or hybrid inflator.

Inflators relying on the combustion of pyrotechnic (gas generating) and initiation materials that have been proposed heretofore have, in general, been subject to certain disadvantages.

For example, such combustion processing typically can result in the production of particulate material. The use of such a particulate-containing inflator emission to inflate an airbag can in turn result in the particulate material being vented out from the airbag and into the vehicle. Typically, the particulate material of such inflator emissions is variously sized and includes a large amount of particulate within the respirable range for humans. Thus, the passage of such gas borne particulate material into the passenger compartment of the vehicle, such as via conventional airbag venting, can result in the undesired respiration of such particulate material by the driver and/or other passengers which in turn can cause consequent respiratory problems. Also, such particulate material can easily become dispersed and airborne so as to appear to be smoke and thereby result in the false impression that there is a fire in or about the vehicle.

Additionally, such combustion processing typically produces heat which must be accounted for in the design of either or both the inflatable restraint system and associated inflator.

As a result of the desire to avoid possibly undesirable combustion products, such as including excessive amounts of particulate material and heat, from undesirably exiting the inflatable restraint system, it has been common to include various screens or filters in airbag module assemblies, either external the inflator to treat the output therefrom, such as shown and described in various prior patents, including commonly assigned U.S. Pat. Nos. 5,378,015; 5,407,226 and 5,518,268, for example, or within the inflator itself, such as shown and described in various prior patents, including the above-referenced commonly assigned U.S. Pat. No. 5,551,724, as well as in commonly assigned U.S. Pat. Nos. 5,480,185; 5,482,316 and 5,503,806, for example.

As will be appreciated, the necessary inclusion of such screens and filters can undesirably complicate and increase the expense associated with the manufacture and production of the assemblies.

Further, the inclusion of such screens and filters almost invariably results in either or both larger inflators and larger assemblies which in turn can detrimentally impact the design and performance of the associated vehicle in which such assembly is to be installed.

Thus there is a need and a demand for improvement in inflatable restraint systems and associated components to reduce cost as well as to improve production, operational and assembly options and capabilities.

SUMMARY OF THE INVENTION

A general object of the invention is to provide an improved inflatable restraint system.

A more specific objective of the invention is to overcome one or more of the problems described above.

The general object of the invention can be attained, at least in part, through a specifically constructed and designed reaction canister. More specifically, the reaction canister structure includes a body having a portion wherein at least a section of an associated inflator is housed in spaced relation to avoid contact with the reaction canister body. In accordance with one embodiment of the invention, the inflator housing portion of the reaction canister body includes a plurality of inflator output treatment fins extending towards, without contacting, the associated inflator.

The prior art fails to provide an as cost effective as desired inflatable restraint system and associated operation for the treatment of the output of an inflator in a manner which desirably can also improve production, operational and assembly options and capabilities, wherein desired treatment of the inflator output typically involves one or more of: cooling, redirection of flow, and removal or filtering of particulate from a contacting stream of the inflator output.

In another embodiment, the invention further comprehends a one-piece conventionally extruded reaction canister body having first and second opposite side walls. The reaction canister body also includes a bridging portion joining the first and second opposite side walls and adapted to house an associated inflator in spaced relation with the inflator avoiding contact with the bridging portion. In this embodiment, the bridging portion includes a plurality of inflator output treatment fins extending towards, without contacting, the associated inflator.

The invention still further comprehends a process for treating the gas output of a vehicular safety restraint inflator housed at least in part within a reaction canister body. The process includes the step of contacting the gas output of the inflator with a treatment element comprising a plurality of inflator output treatment fins extending towards, without contacting, the associated inflator.

As used herein, references to "extrusion" and "conventional extrusion" are to be understood to delineate from impact processing. Specifically, extrusion generally refers to a fundamental processing operation in many industries in which a material is forced through a metal forming die, followed by cooling or hardening such as by chemical or strain hardening. In contrast, in impact processing, a part is formed in a confining die from a metal slug, usually cold, by a single stroke application of force through a punch causing the metal to flow around the punch.

Other objects and advantages will be apparent to those skilled in the art from the following detailed description taken in conjunction with the appended claims and drawings.

DETAILED DESCRIPTION OF THE INVENTION

Figure 1:
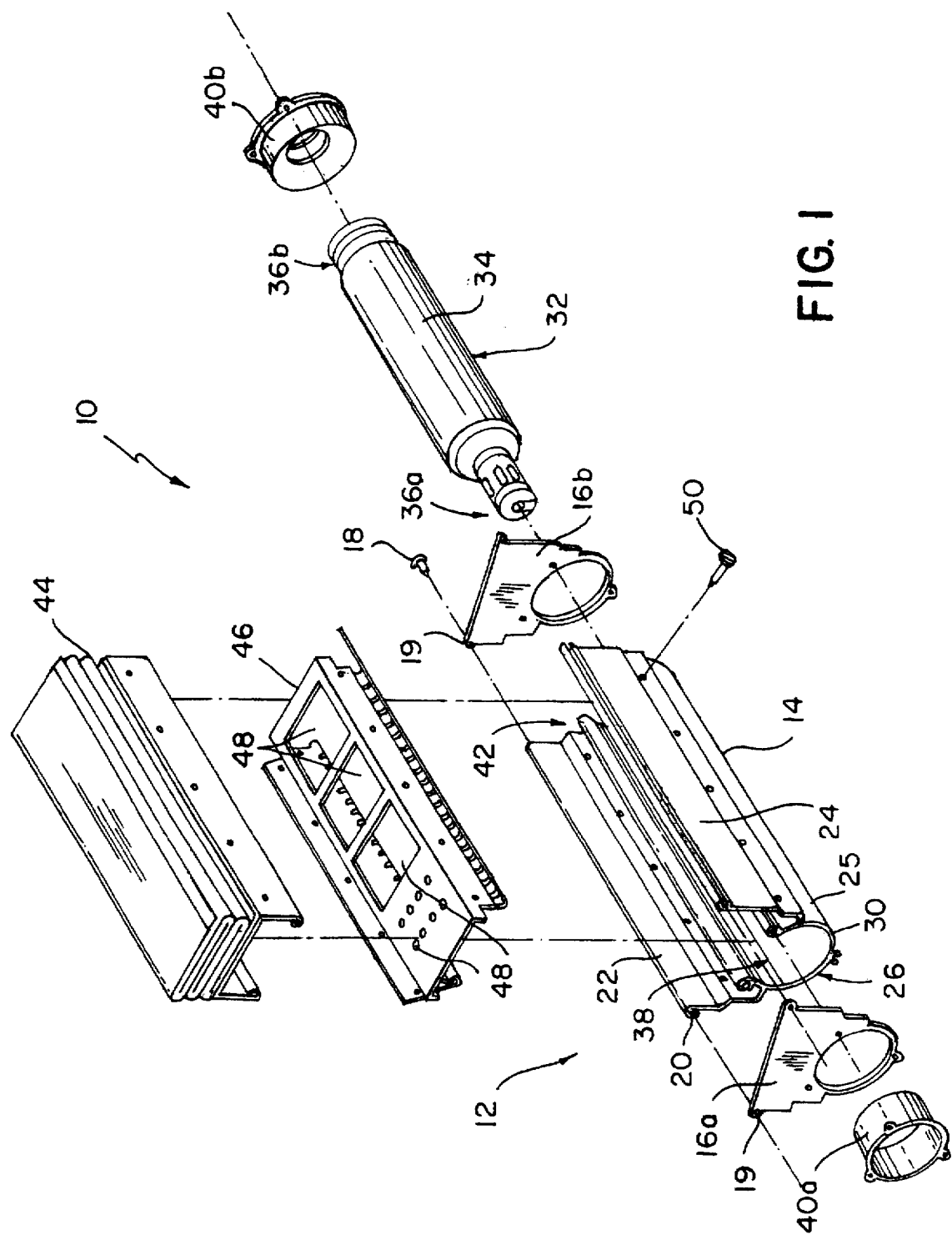
FIG. 1 is a partially exploded simplified perspective view of a typical airbag module assembly.

FIG. 1 illustrates a typical airbag module assembly, generally designated by the reference numeral 10. The airbag module assembly 10 includes a reaction canister 12 formed of a reaction canister body 14, such as specifically described in the above-identified, commonly assigned U.S. Pat. No. 5,407,226, issued Apr. 18, 1995, the disclosure of which is fully incorporated herein by reference. As described therein, the reaction canister body 14 is formed as a one piece construction by means of extrusion of a light weight material such as a relatively light weight metal such as aluminum or magnesium, for example.

The reaction canister body 14 includes the general form of a long, narrow, open receptacle or trough. In the reaction canister 12, end plates 16a and 16b are secured to opposite ends of the reaction canister body 14 such as by means of fasteners 18 (only one of which is shown) which are passed through corresponding fastener holes 19 in the end plates 16a and 16b and into corresponding attachment preparations 20 in the reaction canister body 14.

The reaction canister body 14 also includes first and second opposite side walls or panels, 22 and 24, respectively, joined together by means of a central or bridging portion 25. In the embodiment illustrated in FIG. 1, the central portion 25 has the general form of an integrally shaped inflator holder 26 formed by a wall 30. Such an inflator holder 26 is generally sized, shaped, and adapted for the placement therein of an inflatable restraint system inflator 32, such as having an elongated tubular chamber portion 34 with opposite ends 36a and 36b and from which gas is discharge from one of such ends, in the illustrated assembly 10, from the end 36a.

In practice, such inflator holders generally have a circular cross section extending less than 360°. As described in U.S. Pat. No. 5,407,226, as a result of practical limitations in extrusion fabrication such as those involving die tongue ratio and operational limitations such as the reaction canister body having an opening sized to permit proper gas flow therethrough while permitting proper spacing and locating of attachment preparations as well as having an inflator holder functioning as a retaining device for an inflator, such an extruded reaction canister body having an inflator holder of partial circular cross section will generally include a gap opening 38 of an arc angle of at least about 45°, preferably at least about 90°, and typically no more than about 180°, preferably no more than about 135°.

It is to be appreciated that, in accordance with the invention, the reaction canister body part central portion can be variously sized and shaped, as desired and need not be shaped as an inflator holder of such partial circular cross section. For example, as later described herein, such reaction canister body part central portion can, if desired, be of a generally continuous circular cross sectional shape.

Returning to FIG. 1, the inflator 32 is further secured within the reaction canister 12, and specifically the inflator holder 26, by means of end bases 40a and 40b at each of the ends 36a and 36b, respectively, in a manner such that the inflator 32 is generally longitudinally coaxially aligned within the inflator holder 26 and in spaced relation therewith whereby contact by the inflator 32 with the inflator holder wall 30 is avoided. By maintaining the inflator in spaced relation with the reaction canister inflator holder wall, a gas flow path between the inflator and the reaction canister wall is provided wherethrough the output from the inflator can be passed. It will be appreciated that undesired contact between an inflator and an associated reaction canister wall can obstruct or result in unbalanced gas flow from the reaction canister to the associated airbag and thus result in problems such as undesired airbag deployment geometries.

The reaction canister body side walls 22 and 24 are generally spaced apart and 25 in conjunction with the inflator 32 and the first and second end plates 16a and 16b define an airbag storage cavity, generally designated by the reference numeral 42, wherein an airbag 44, such as folded in a conventional manner, can be housed.

Such a reaction canister structure provides protection for the inflator 32 and the airbag 44 until the time of deployment of the airbag and also acts to absorb the loads generated upon such deployment. Typically, these loads are large and unless sufficiently absorbed can cause damage to the vehicle including, in the case of a passenger side assembly, damage to the dashboard panel.

To assist in producing or forming a more uniform or orderly distribution of gas into the inflating airbag and whereby a more uniformly and/or orderly deployment of the inflating airbag can be effected, the assembly 10 can, if desired, include a diffuser device 46 having a plurality of gas passage openings 48 therein located and sized to provide a desired distribution of gas from the inflator 32 into the airbag 44 at the time of deployment.

The airbag 44 and the diffuser device 46 are typically secured within the assembly 10 by means of fasteners 50 (only one of which is shown) joining the airbag 44 and the diffuser device 46 to the reaction canister 12, specifically the reaction canister body 14.

Figure 2:
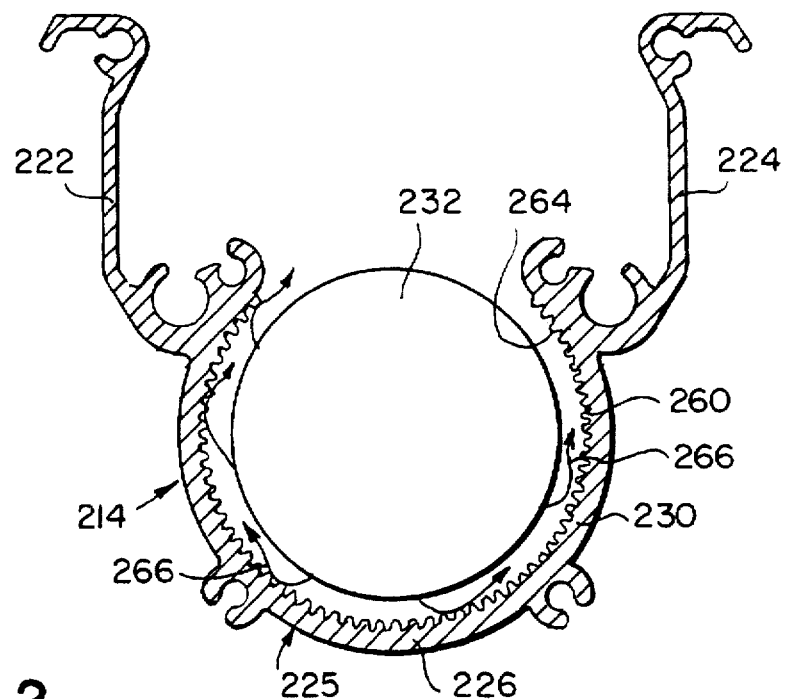
FIG. 2 is a simplified, partial cross sectional end view of an inflator and a reaction canister body in accordance with one embodiment of the invention.

Turning now to FIG. 2, there is shown an inflator 232 and a reaction canister body 214 in accordance with one embodiment of the invention. The reaction canister body part 214 is generally similar to the reaction canister body 14 shown in FIG. 1 and described above and includes the general form of a long, narrow, open receptacle or trough. The reaction canister body 214, similar to the reaction canister body 14, also includes first and second opposite side walls or panels, 222 and 224, respectively, joined together by means of a central or bridging portion 225 having the form of an integrally shaped inflator holder 226 formed by a wall 230. As with the above described inflator holder 26, the inflator holder 226 is generally sized, shaped, and adapted for the placement therein of the inflatable restraint system inflator 232, coaxially aligned and in spaced relation, as described above.

The reaction canister body 214 differs from the reaction canister 14, however, by the inclusion of a plurality of longitudinally extending inflator output treatment fins 260 on the inner surface 264 of the inflator holder wall 230. Such fins are useful in the treatment of the output from the associated inflator, such as an elevated temperature, particulate-containing gaseous emission. As described above, such treatment of a contacting stream typically involves one or more of: cooling, redirection of flow, and removal or filtering of particulate therefrom.

Upon activation of the inflator 232, gas (signified by the arrows 266) is discharged from the inflator 232 and flows adjacent to and in contact with inflator output treatment fins 260 on the inner surface 264 of the inflator holder 226 and subsequently out to the associated airbag assembly (not shown). The gas output 266 from the inflator 232 is treated in accordance with the invention as the gas output contacts the inflator output treatment fins 260 on the inner wall surface 264 and which fins extend towards, without contacting, the associated inflator 232. In such practice, the reaction canister body 214 with the inflator output treatment fins 260 constitutes a treatment element.

The inclusion of the inflator output treatment fins 260 on the wall inner surface 264, increases the surface area of reaction canister wall 230 in fluid communication with the emission from the inflator 232. As heat transfer is generally proportional to heat transfer surface area, the increase in the surface area resulting from the inclusion of the inflator output treatment fins results in increased heat transfer from the emission of the inflator to the reaction canister body part. Further, as the high velocity, often turbulent emission from the inflator contacts the finned surface, the inclusion of the inflator output treatment fins can assist in the trapping and removal of particles from the inflator emission prior to passage of the airbag inflation gas out of the reaction canister and into an associated airbag.

It is to be understood that the inflator output treatment provided by way of the invention can be used, as may be desired, as an alternative or supplement to treatment means such as screens or filters as may be provided within or external the inflator such as described above.

As described above, the reaction canister body can desirably be formed as a one piece construction by means of extrusion of a light weight material such as a relatively light weight metal such as aluminum or magnesium, for example. It is to be appreciated that the inclusion of a plurality of inflator output treatment fins, in accordance with the invention, is relatively easily accomplished with extrusion fabrication by the appropriate complimentary corresponding alteration of the extrusion die. It will also be appreciated that with the use of extrusion fabrication, the inflator output treatment fins of the invention will typically extend in a longitudinal direction as extrusion fabrication is conducive to the formation of longitudinally extending shapes.

Further, it is to be understood that the invention in its broader aspects is not limited to the specific reaction canister body shape shown in FIG. 2.

For example, if desired, the invention can be practice in conjunction with a reaction canister body that does not include sidewalls such as the side walls 222 and 224, such as may be desired in certain applications such as certain soft-pack airbag module assemblies, for example, wherein the airbag is not stored in a hard walled component of an airbag module assembly prior to installation within a vehicle.

Still further, it will be understood the invention can be practiced in conjunction with reaction canisters having appropriately selectively altered central or bridging portion cross sectional shapes.

Figure 3:
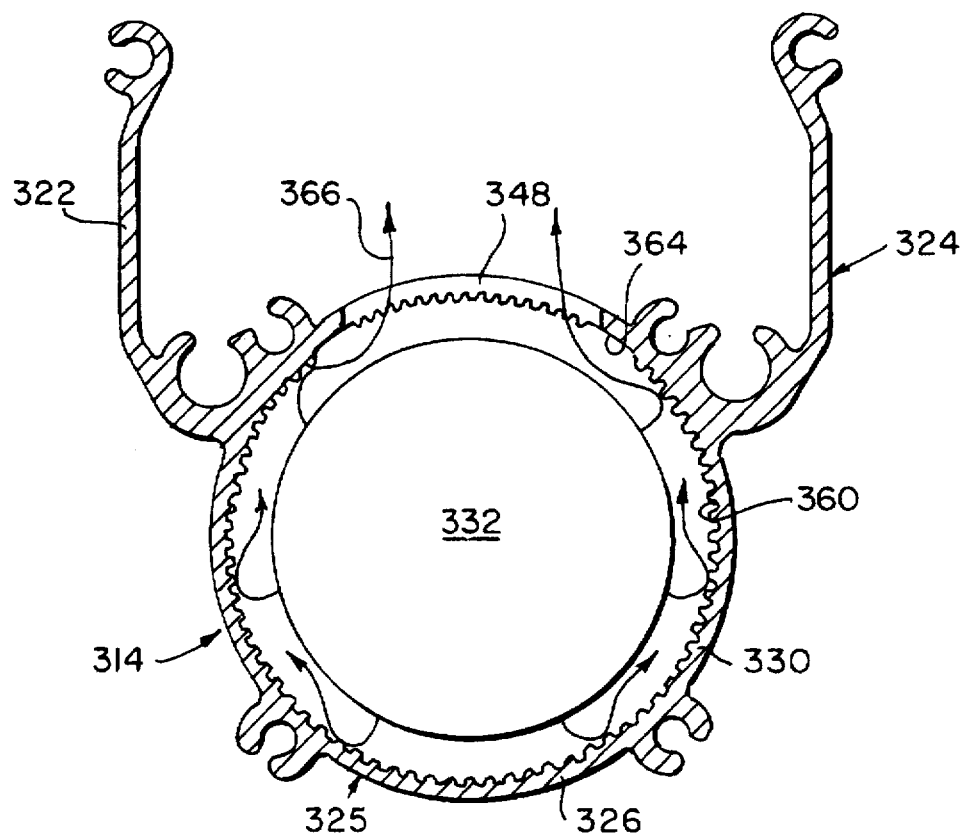
FIG. 3 is a simplified, partial cross sectional end view, similar to FIG. 2, of an inflator and a reaction canister body in accordance with an alternative embodiment of the invention.

For example, FIG. 3 illustrates an inflator 332 and a reaction canister body 314 generally similar to the reaction canister body 214 of FIG. 2 with the reaction canister body 314 including first and second opposite side walls or panels, 322 and 324, respectively, joined together by means of a central or bridging portion 325. In the reaction canister body 314, however, the central or bridging portion 325 is in the general shape of a continuous circumference diffuser 326 formed by a wall 330 and having gas passage openings 348 formed in the continuous circumference diffuser 326 to permit desired passage of the inflation gas from the inflator 332 into the associated airbag (not shown). Such a reaction canister body part central portion is generally of a continuous circular cross sectional shape, as identified above. Such a body part is shown and described in commonly assigned U.S. Pat. No. 5,332,256, issued Jul. 26, 1994, the disclosure of which is fully incorporated herein by reference.

As disclosed in U.S. Pat. No. 5,332,256, such a reaction canister assembly features both a reaction canister body and a diffuser tube of continuous circumference formed as one part. Such type of diffuser tube provides a strong attachment means for the diffuser, indexing of the diffuser, containment of the generated gases of combustion at a lower gas pressure and provides a method for directing the gas for better airbag deployment. Other benefits derived from the utilization of a diffuser tube integral with the reaction canister include facilitating sealing the inflator against leakage into the passenger compartment of the vehicle and simplifying installation of the inflator as a last operation of assembly.

The reaction canister body 314 includes a plurality of longitudinally extending inflator output treatment fins 360 on the inner surface 364 of the continuous circumference diffuser central portion 325. As identified above, such fins are useful in the treatment of the output from the associated inflator, such as an elevated temperature, particulate-containing gaseous emission, with such treatment of a contacting stream typically involves one or more of: cooling, redirection of flow, and removal or filtering of particulate therefrom.

Upon activation of the inflator 332, gas (signified by the arrows 366) is discharged from the inflator 332 and flows adjacent to and in contact with inflator output treatment fins 360 on the inner surface 364 of the continuous circumference diffuser central portion 325 and subsequently out to the associated airbag assembly (not shown). The gas output 366 from the inflator 332 is treated in accordance with the invention as the gas output contacts the inflator output treatment fins 360 on the inner wall surface 364 and which fins extend towards, without contacting, the associated inflator 332.

While the invention has been described above relative to reaction canister assemblies having a reaction canister body wherein the inflator output treatment fins are formed in a one piece construction with the respective reaction canister body, it is to be understood that the invention is not so limited.

For example, if desired, the invention can be practiced with a reaction canister body wherein the inflator output treatment fins of the invention are formed on a separate piece, e.g., a sleeve, fitted therewithin.

Figure 5:
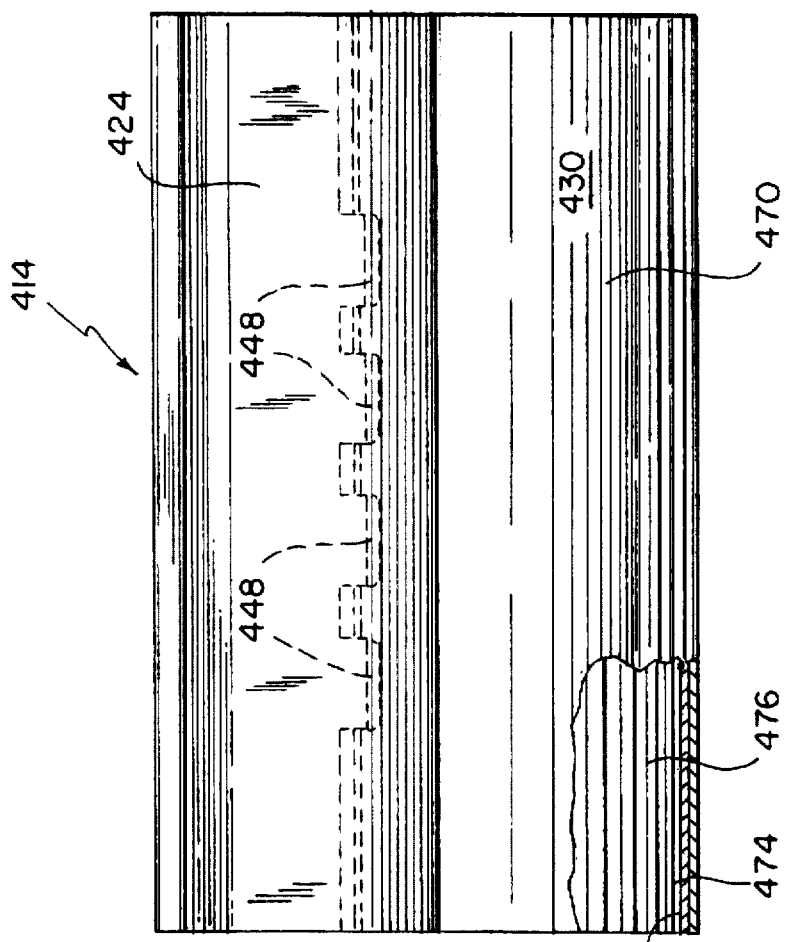
FIG. 5 is a partial cross sectional side view of the reaction canister body of FIG. 4 taken substantially along the line 5—5 of FIG. 4 and viewed in the direction of the arrows.
Figure 4:
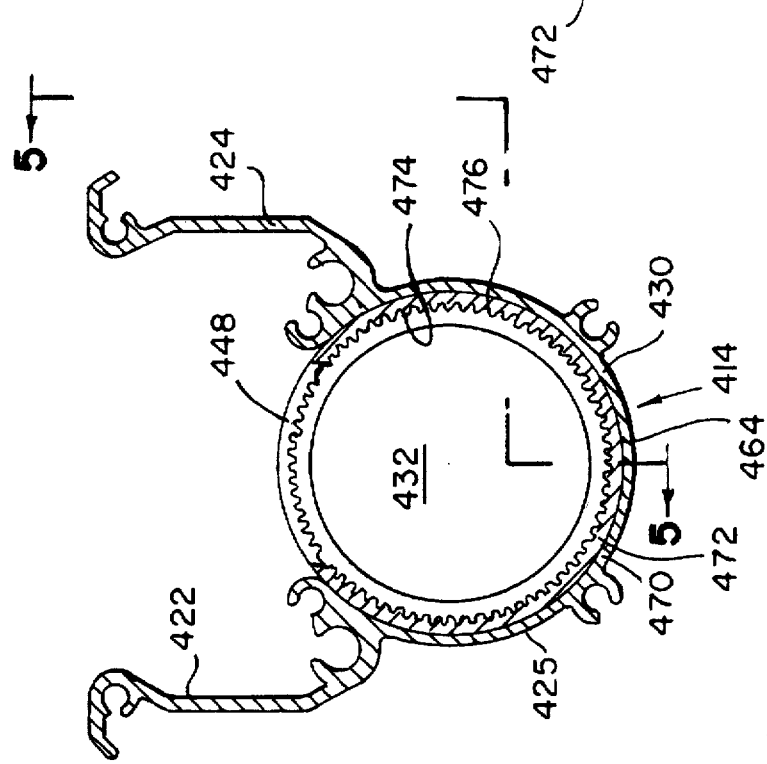
FIG. 4 is a simplified, partial cross sectional end view, similar to FIGS. 2 and 3, of an inflator and a reaction canister body in accordance with another alternative embodiment of the invention.

FIGS. 4 and 5 illustrate one such reaction canister body, generally designated by the reference numeral 414, having a multiple piece construction, e.g., an outer sleeve portion 470 and an inner sleeve portion 472. In order to avoid unnecessary complication of the drawings, the associated inflator, designated by the reference numeral 432, is shown only in FIG. 4.

The outer sleeve portion 470 is generally similar to the above-described reaction canister body 214 in that it includes the general form of a long, narrow, open receptacle or trough and includes first and second opposite side walls or panels, 422 and 424, respectively, joined together by means of a central or bridging portion 425 formed by a wall 430, having a general form similar to the above-described inflator holder 226. The outer sleeve portion 470, however, differs from the above-described reaction canister body 214 in that the inner surface 464 of the wall 430 is generally smooth. The inner sleeve portion 472 is fitted thereagainst and has an inner surface 474 which includes a plurality of the inflator output treatment fins 476, in accordance with the invention.

Operation of an inflatable restraint system including a reaction canister body of such multiple piece construction is similar to that described above. Specifically, upon activation of the inflator 432, the output from the inflator flows adjacently to and in contact with the inflator output treatment fins 476 on the inner surface 474 of the inner sleeve portion 472. As a result, the output from the inflator is treated in accordance with the invention.

It will be appreciated that such an embodiment wherein the inflator output treatment fins of the invention are provided on a separate piece such as a liner designed to fit within a reaction canister assembly will permit and facilitate the utilization of the treatment fins of the invention with variously formed or fabricated reaction canister assemblies. Thus, it is to be understood that the practice of the invention is not limited to use in conjunction with extruded reaction canisters. For example, such a liner or inner sleeve portion with inflator output treatment fins can be used within a reaction canister assembly formed of stamped or pressed sheet metal. The manufacture or production of such a liner or inner sleeve portion by means of extrusion fabrication is a preferred means to form such liners due to the processing benefits and simplification which result from such extrusion fabrication.

While the invention has been described above relative to an embodiment wherein the outer sleeve inner surface 464 is smooth, as such inner surface is not contacted by the outflow from the associated inflator, it will be appreciated that such inner surface need not be smooth in order to practice the invention. For example, such inner surface can, if desired, include one or more various surface features such as ribs or bumps in order to permit or facilitate the adjacent placement and securement of the inner liner sleeve portion 472.

While the invention has been described above relative to reaction canister body parts wherein the inflator output treatment fins longitudinally extend substantially the entire length of the reaction canister body, it is to be understood that the invention can, if desired, be practiced with a reaction canister body wherein the inflator output treatment fins longitudinally extend only a portion of the length of the body part.

Figure 7:
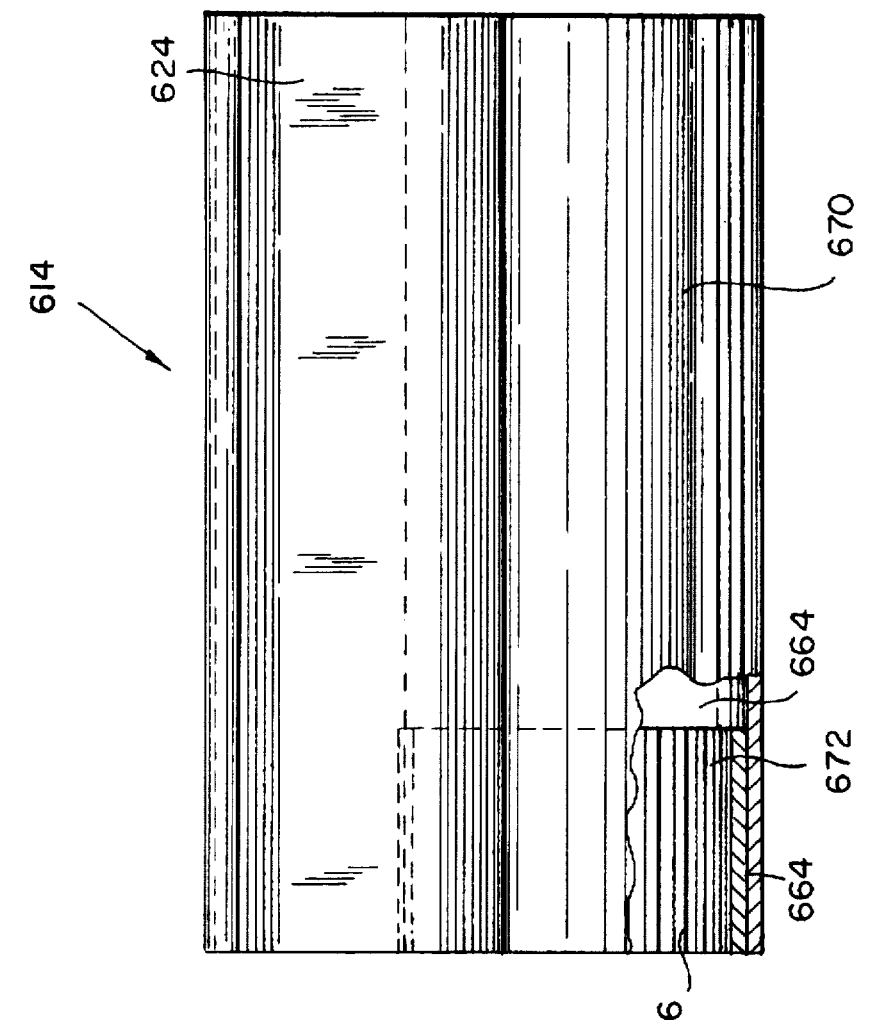
FIG. 7 is a partial cross sectional side view of the reaction canister body of FIG. 6 taken substantially along the line 6—6 of FIG. 6 and viewed in the direction of the arrows.
Figure 6:
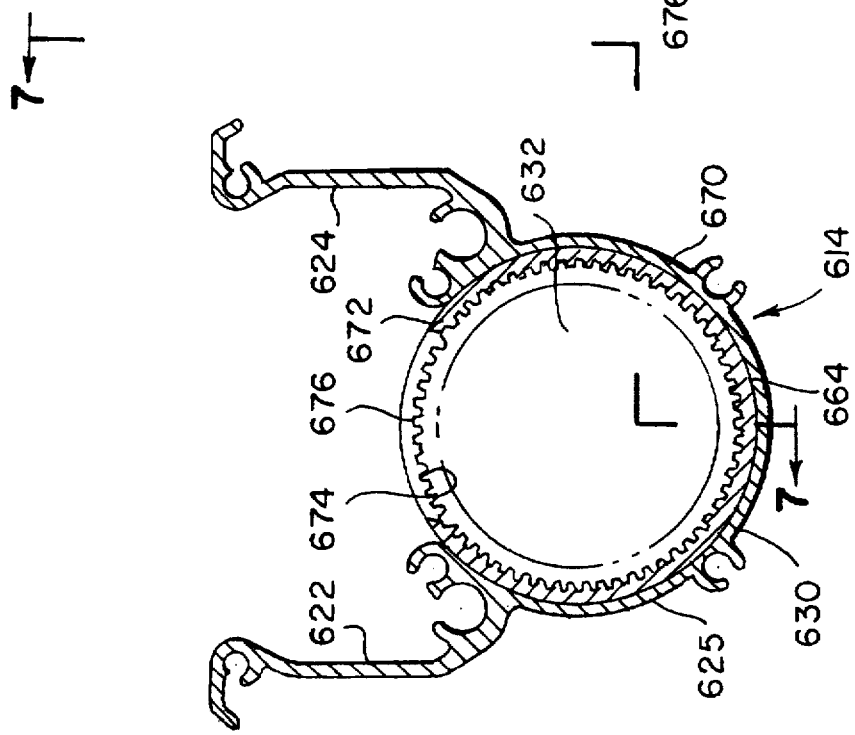
FIG. 6 is a simplified, partial cross sectional end view, similar to FIGS. 2, 3 and 4, of an inflator and a reaction canister body in accordance with yet another alternative embodiment of the invention.

FIGS. 6 and 7 illustrate one such reaction canister body, generally designated by the reference numeral 614. The reaction canister body 614 is generally similar to the reaction canister body 414 shown in FIGS. 4 and 5 and described above in that it includes a multiple piece construction, e.g., an outer sleeve portion 670 and a tubular inner sleeve portion 672. Again, in order to avoid unnecessary complication of the drawings, the associated inflator, designated by the reference numeral 632, is shown only in FIG. 6.

The outer sleeve portion 670 is generally similar to the above-described reaction canister body 470 in that it includes the general form of a long, narrow, open receptacle or trough and includes first and second opposite side walls or panels, 622 and 624, respectively, joined together by means of a central or bridging portion 625 formed by a wall 630, having a general form similar to the above-described inflator holder 226. Again, the inner surface 664 of the wall 630 of the outer sleeve portion 670 is generally smooth.

The inner sleeve portion 672 is fitted thereagainst and has an inner surface 674 which includes a plurality of the inflator output treatment fins 676, in accordance with the invention.

It will be appreciated that such truncated inner sleeve portion can be maintained in proper relative position to the outer sleeve portion by means of one or more appropriate interference fit or surface features such as ribs or bumps, such as described above, for example.

In the reaction canister body 614, however, the inner sleeve portion 672 while again fitted against the inner surface 664 of the outer sleeve portion 670 extends only along a segment of the longitudinal length of the outer sleeve 670. Such a shortened inner sleeve portion is sometimes referred to herein as "truncated." Such an arrangement wherein the inflator output treatment fins longitudinally extend for only a portion of the reaction canister length, i.e., the inflator output treatment fins are truncated, may, for example, find utility in inflatable restraint systems having an end discharge inflator, such as the inflator 32 shown in FIG. 1. With such inflators, the inflator output is concentrated from one particular end or portion of the inflator rather than distributed along the length of the inflator. As a result, the inflator output treatment provided by way of appropriately positioning such a truncated sleeve within the reaction canister assembly such that the treatment fins are provided at the location whereat the benefits of inflator output treatment can desirably be realized, for example, at the end of the assembly adjacent the discharge end of the inflator.

In view of the above, it will be appreciated that through the inclusion and use of the inflator output treatment fins of the invention, the invention can reduce or eliminate the need for or reliance on various treatment means, such as screens or filters, in or out of the inflator, for treating the inflation gas used for airbag inflation. As a result, the invention can provide a solution to the need and demand for improvement in inflatable restraint systems and associated components to reduce cost as well as to improve production, operational and assembly options and capabilities.

While the invention has been described hereinabove with particular reference to a passenger side airbag module assembly for automotive vehicles including vans, pick-up trucks, and particularly automobiles, it is to be understood that the invention also has applicability not only with other types or kinds of vehicles including, for example, airplanes, but also can, if desired, be used with other types or kinds of airbag module assemblies for automotive vehicles including, for example, side impact and driver side assemblies.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. In an inflatable restraint system including a reaction canister structure body having a portion wherein at least a section of an associated inflator is housed in spaced relation to avoid contact therebetween, the improvement comprising:

the inflator housing portion of the reaction canister body including a plurality of inflator output treatment fins extending towards, without contacting, the associated inflator.

2. The improvement of claim 1 wherein the reaction canister body is formed by conventional extrusion fabrication.

3. The improvement of claim 2 wherein the reaction canister body is formed by conventional extrusion fabrication of a light weight metal selected from the group of aluminum and magnesium.

4. The improvement of claim 1 wherein the reaction canister body includes first and second opposite side walls and a bridging portion joining said first and second opposite side walls, said bridging portion forming the inflator housing portion of the reaction canister body.

5. The improvement of claim 1 wherein the inflator housing portion of the reaction canister body is in the form of an inflator holder of partial circular cross section.

6. The improvement of claim 1 wherein the inflator housing portion of the reaction canister body is generally of a continuous circular cross sectional shape.

7. The improvement of claim 1 wherein the inflator and the inflator housing portion of the reaction canister body are longitudinally elongated and wherein the inflator output treatment fins are longitudinally extending.

8. The improvement of claim 7 wherein the inflator output treatment fins longitudinally extend substantially the entire length of the reaction canister body.

9. The improvement of claim 7 wherein the inflator output treatment fins longitudinally extend only along a segment of the longitudinal length of the reaction canister body.

10. The improvement of claim 1 wherein the inflator housing portion of the reaction canister body with the plurality of inflator output treatment fins is of one piece construction.

11. The improvement of claim 1 wherein the inflator housing portion of the reaction canister body with the plurality of inflator output treatment fins is of multiple piece construction including a tubular inner sleeve having an inner surface which includes the inflator output treatment fins.

12. A one-piece conventionally extruded reaction canister body having first and second opposite side walls and a bridging portion joining said first and second opposite side walls and adapted to house an associated inflator in spaced relation with the inflator avoiding contact therewith, the improvement comprising:

the bridging portion including a plurality of inflator output treatment fins extending towards, without contacting, the associated inflator.

13. The improvement of claim 12 wherein the reaction canister body is formed by conventional extrusion fabrication of a light weight metal selected from the group of aluminum and magnesium.

14. The improvement of claim 12 wherein the bridging portion is in the form of an inflator holder of partial circular cross section.

15. The improvement of claim 12 wherein the bridging portion is generally of a continuous circular cross sectional shape.

16. The improvement of claim 12 wherein the inflator and the reaction canister body are longitudinally elongated and wherein the inflator output treatment fins are longitudinally extending.

17. A process for the treatment of the gas output of a vehicular safety restraint inflator housed at least in part within a reaction canister body, said process comprising the step of:

contacting the gas output of the inflator with a treatment element comprising a plurality of inflator output treatment fins extending towards, without contacting, the associated inflator.

18. The process of claim 17 wherein the treatment comprises cooling the vehicular safety restraint inflator gas output.

19. The process of claim 17 wherein the treatment comprises removal of particulate from the vehicular safety restraint inflator gas output.

\* \* \* \* \*